(12) United States Patent
Murray et al.

(10) Patent No.: US 8,967,563 B2
(45) Date of Patent: Mar. 3, 2015

(54) FITNESS EQUIPMENT BRACKET ADJUSTMENT STRUCTURE

(71) Applicant: Dyaco International Inc., Taipei (TW)

(72) Inventors: Brian Murray, Taichung (TW);
Hung-Yi Hu, Hemei Town (TW);
Kuang-Shiung Kao, Hemei Town (TW)

(73) Assignee: Dyaco International Inc., Taipei (TW)

( * ) Notice: Subject to any disclaimer, the term of this patent is extended or adjusted under 35 U.S.C. 154(b) by 181 days.

(21) Appl. No.: 13/759,593

(22) Filed: Feb. 5, 2013

(65) Prior Publication Data

US 2014/0158843 A1   Jun. 12, 2014

(30) Foreign Application Priority Data

Dec. 12, 2012   (TW) .............................. 101146941 A (51) Int. Cl.
*A47B 96/06*    (2006.01)
*A63B 21/00*    (2006.01)
*F16M 11/04*    (2006.01)

(52) U.S. Cl.
CPC .............. *A63B 21/00* (2013.01); *F16M 11/041* (2013.01); *F16M 11/048* (2013.01); *F16M 2200/027* (2013.01)
USPC ..................... 248/218.4; 248/219.3; 248/200; 248/207; 248/124.1

(58) Field of Classification Search
USPC ................... 248/218.4, 219.3, 219.4, 220.21, 248/221.11, 222.14, 200, 200.1, 207, 251, 248/274.1, 354.1, 511.512, 513, 124.1, 248/125.8, 130; 482/57, 58, 59, 60, 61, 62, 482/63, 64, 65, 92
See application file for complete search history.

(56) References Cited

U.S. PATENT DOCUMENTS

| | | | | |
|---|---|---|---|---|
| 3,554,585 A | * | 1/1971 | Sorenson | 403/105 |
| 3,848,870 A | * | 11/1974 | Craig | 482/44 |
| 4,586,399 A | * | 5/1986 | Kassai | 74/551.3 |
| 4,596,484 A | * | 6/1986 | Nakatani | 403/104 |
| 4,744,690 A | * | 5/1988 | Hsieh | 403/104 |
| 4,761,092 A | * | 8/1988 | Nakatani | 403/104 |
| 4,826,150 A | * | 5/1989 | Minoura | 482/61 |
| 4,902,002 A | * | 2/1990 | Huang | 482/62 |
| 4,915,374 A | * | 4/1990 | Watkins | 482/57 |
| 4,932,650 A | * | 6/1990 | Bingham et al. | 482/59 |
| 6,347,777 B1 | * | 2/2002 | Webber et al. | 248/354.1 |

(Continued)

FOREIGN PATENT DOCUMENTS

| | | |
|---|---|---|
| TW | 085207027 | 5/1997 |
| TW | 088215465 | 9/2000 |

*Primary Examiner* — Monica Millner
(74) *Attorney, Agent, or Firm* — Huffman Law Group, PC (57) ABSTRACT

A fitness equipment bracket adjustment structure includes an adjustable sliding bracket including a base member defining therein a sliding groove, a sliding member coupled to and movable in and out of the sliding groove of the base member and a positioning member fixedly fastened to a sidewall of the base member and kept in communication with the sliding groove, and a locking device set including an anti-skid block mounted between the sliding member and the positioning member and defining a stop portion detachably abutted against the sliding member of the adjustable sliding bracket, a connection member inserted through a through hole of the anti-skid block, a coupling member fixedly connected to the connection member and threaded with its one end into the positioning member and a handle coupled to the other end of the coupling member and rotatable relative to the coupling member.

6 Claims, 6 Drawing Sheets

(56) References Cited

U.S. PATENT DOCUMENTS

| | | | |
|---|---|---|---|
| 6,536,723 B1 * | 3/2003 | Nakatani | 248/163.1 |
| 6,612,970 B2 * | 9/2003 | Forcillo | 482/57 |
| 6,669,603 B1 * | 12/2003 | Forcillo | 482/57 |
| 7,017,872 B2 * | 3/2006 | Hogle et al. | 248/162.1 |
| 7,293,934 B1 * | 11/2007 | Huang | 403/109.1 |
| 7,399,260 B1 * | 7/2008 | Chen | 482/145 |
| 8,025,455 B2 * | 9/2011 | Huang et al. | 403/322.4 |
| 8,257,231 B2 * | 9/2012 | Bingham et al. | 482/57 |
| 8,388,254 B2 * | 3/2013 | Huang | 403/109.1 |
| 8,408,094 B2 * | 4/2013 | Chen | 74/594.1 |
| 8,608,118 B2 * | 12/2013 | Lai | 248/74.3 |
| 8,702,046 B2 * | 4/2014 | Cooper | 248/125.8 |
| 2004/0248702 A1 * | 12/2004 | Baker | 482/57 |
| 2005/0245357 A1 * | 11/2005 | Horvath | 482/51 |

\* cited by examiner

FITNESS EQUIPMENT BRACKET ADJUSTMENT STRUCTURE

BACKGROUND OF THE INVENTION

1. Field of the Invention

The present invention relates to fitness equipment and more particularly, to a fitness equipment bracket adjustment structure that allows the user to conveniently adjust the length of the bracket of the fitness equipment.

2. Description of the Related Art

Commercial fitness equipment, such as fitness bike, normally will make the saddle adjustable, so that users of different heights can perform exercises comfortably and conveniently. For example, Taiwan Patent Application No. 085207027 discloses an adjustable saddle design, entitled "Saddle positioning adjustment structure for fitness bike". According to this design, a tightening-up screw is threaded downwardly against a metal plate member to force a spring plate portion of a sliding socket to impart a downward pressure to the outer perimeter of an axle of the frame of the fitness bike, thereby locking the saddle of the fitness bike to the axle of the frame. However, it is troublesome and inconvenient to adjust the elevation of the saddle by means of a screw.

Taiwan Patent Application No. 088215465 discloses an improved adjustment structure, entitled "Fitness bike adjustment structure" designed to improve the drawback of the aforesaid prior art design. According to this design, a quick-release clamping sleeve is mounted in the stem of the saddle for quick adjustment of the height of the saddle. However, in actual use, the user must move the retractable frame relative the handlebar stem. If the applied force is too much during adjustment, the structure will be over-adjusted and must be corrected. Further, when fastening tight the quick-release clamping sleeve, the user must employ much effort to achieve effective positioning. This adjustment manner is un-efficiency.

Further, if the handlebar or screw bolt is over-rotated during unlocking operation, the handlebar or screw bolt may fall to the floor.

In view of the above, the present inventor painstakingly researched measures and employed theoretical models to improve the drawbacks of the aforesaid prior art designs and to enhance the effectiveness.

SUMMARY OF THE INVENTION

The present invention has been accomplished under the circumstances in view. It is the main object of the present invention to provide a fitness equipment bracket adjustment structure, which allows the user to rapidly and conveniently adjust the length of the bracket adjustment structure.

To achieve this object, a fitness equipment bracket adjustment structure comprises an adjustable sliding bracket and a locking device set. The adjustable sliding bracket comprises a base member, a sliding member and a positioning member. The base member comprises a bottom wall and a sidewall. The bottom wall defines therein an accommodation chamber. The sliding member is mounted in the accommodation chamber of the base member, and axially movable relative to the base member. The positioning member comprises a through hole. The positioning member is fixedly connected to the sidewall of the base member and kept in communication with the accommodation chamber of the base member. The locking device set is mounted in the positioning member of the adjustable sliding bracket. The locking device set comprises an anti-skid block, a connection member, a coupling member and a handle. The anti-skid block is mounted between the sliding member and the positioning member, comprising a stop portion and a through hole. The stop portion is detachably abutted against the sliding member of the adjustable sliding bracket. The connection member is inserted through the through hole of the anti-skid block and tightly fastened to the coupling member. The coupling member comprises an adapter portion located at its one end and mounted in the through hole of the positioning member. The other end of the coupling member is coupled with the handle such that the handle is operable to move the anti-skid block between the sliding member and the positioning member.

Thus, by means of rotating the handle, the anti-skid block can be forced into engagement with the sliding member or moved away from the sliding member, allowing the user to conveniently and rapidly adjust the length of the fitness equipment bracket adjustment structure.

It is another object of the present invention to provide a fitness equipment bracket adjustment structure, which prevents falling of the handle when the handle is excessively loosened during adjustment of the length of the fitness equipment bracket adjustment structure.

To achieve this object, a fitness equipment bracket adjustment structure comprises an adjustable sliding bracket and a locking device set. The adjustable sliding bracket comprises a base member, a sliding member and a positioning member. The base member comprises a bottom wall and a sidewall. The bottom wall defines therein an accommodation chamber. The sliding member is mounted in the accommodation chamber of the base member and axially movable relative to the base member. The positioning member comprises a through hole. Further, the positioning member is fixedly connected to the sidewall of the base member and kept in communication with the accommodation chamber. The locking device set is mounted in the positioning member of the adjustable sliding bracket, comprising an anti-skid block, a connection member, a coupling member, a handle, a locking member and an elastic member. The anti-skid block is mounted between the sliding member and the positioning member, comprising a stop portion and a through hole. The stop portion is detachably abutted against the sliding member of the adjustable sliding bracket. The connection member is inserted through the through hole of the anti-skid block and fixedly connected to the coupling member. The coupling member comprises an adapter portion located at its one end. The adapter portion is mounted in the through hole of the positioning member. The coupling member has its other end coupled with the handle that is operable to move the anti-skid block between the sliding member and the positioning member. The handle comprises a barrel located at its one end and coupled to the coupling member. The barrel defines therein an annular stop flange, and a first receiving chamber and a second receiving chamber respectively disposed at two opposite sides relative to the annular stop flange. The first receiving chamber accommodates the connection member. The locking member comprises a head. The elastic member is mounted around the locking member, having its one end stopped against the head of the locking member and its other end positioned in the second receiving chamber and stopped against the annular stop flange.

Subject to the aforesaid arrangement, the handle will not fall down when it is excessively loosened during adjustment of the length of the fitness equipment bracket adjustment structure.

Other advantages and features of the present invention will be fully understood by reference to the following specification in conjunction with the accompanying drawings, in which like reference signs denote like components of structure.

DETAILED DESCRIPTION OF THE INVENTION

Figure 1:
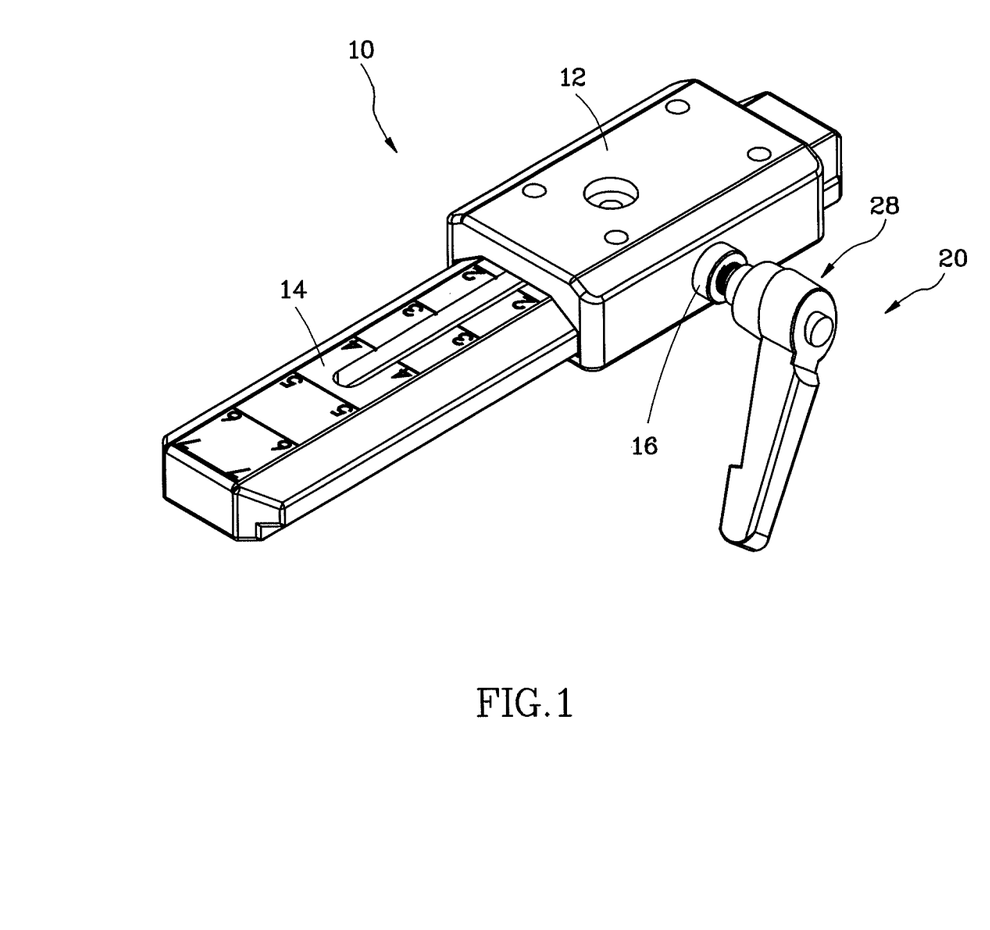
FIG. 1 is an elevational view of a fitness equipment bracket adjustment structure in accordance with the present invention.
Figure 2:
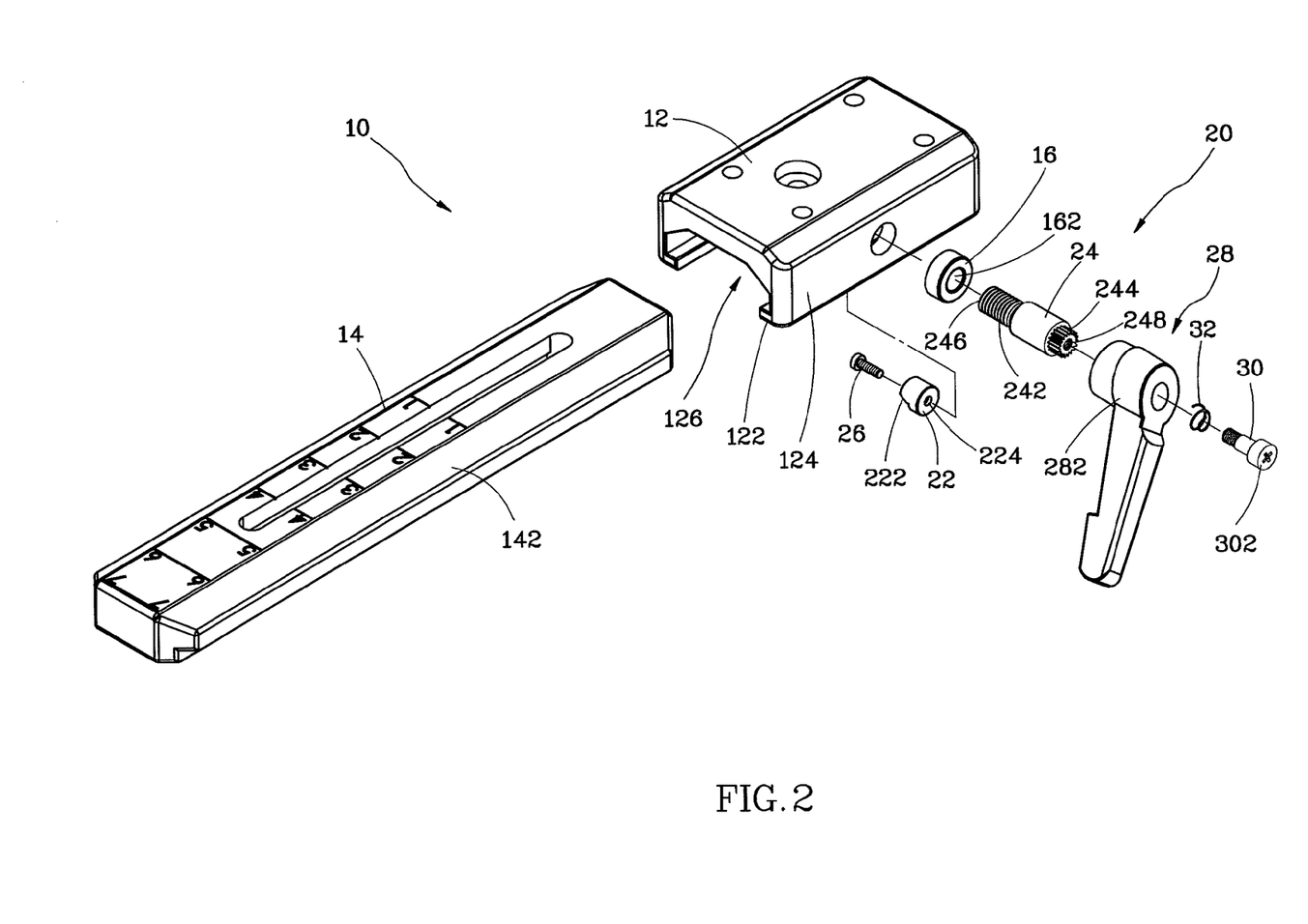
FIG. 2 is an exploded view of the present invention, illustrating the structure of each component part of the fitness equipment bracket adjustment structure.
Figure 3:
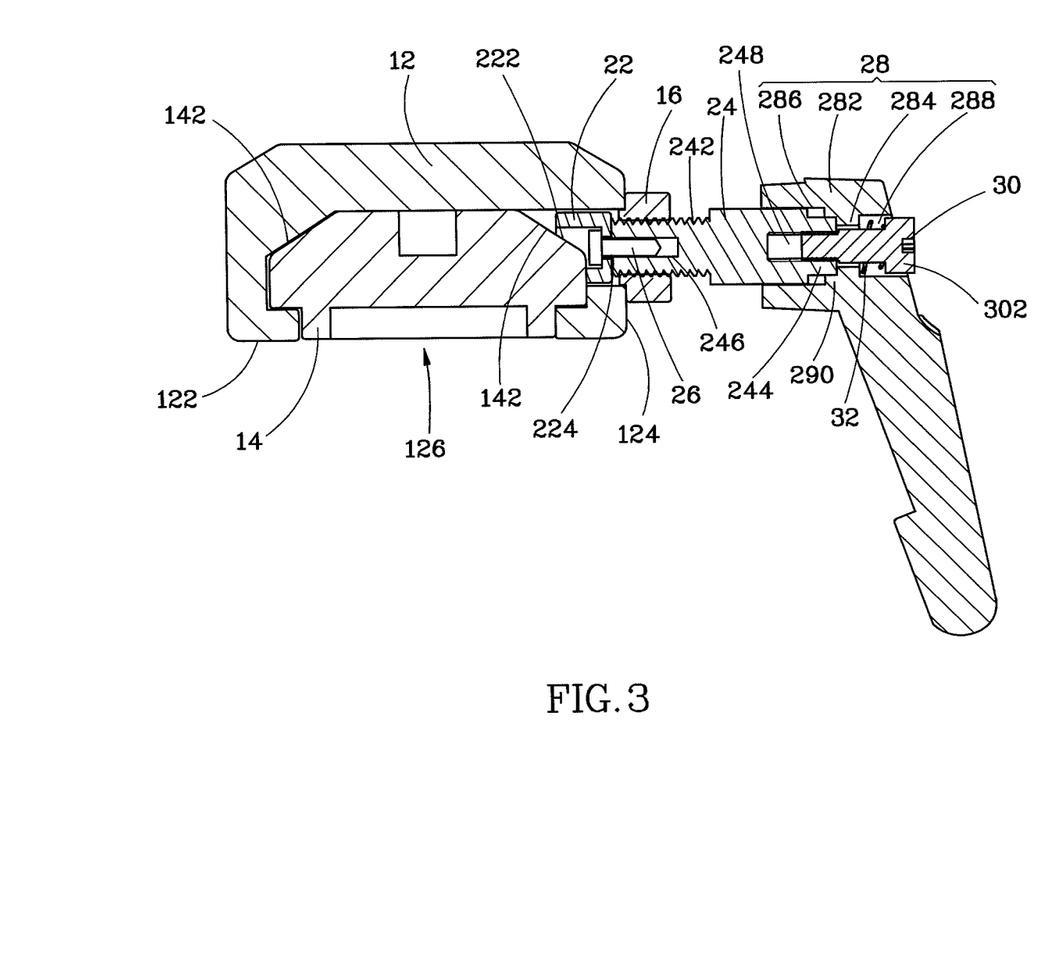
FIG. 3 is a sectional assembly view of the present invention, illustrating the anti-skid block abutted against the sliding member.

Referring to FIGS. 1-3, a fitness equipment bracket adjustment structure in accordance with the present invention is shown. The fitness equipment bracket adjustment structure comprises an adjustable sliding bracket 10, and a locking device set 20.

The adjustable sliding bracket 10 comprises a base member 12, a sliding member 14, and a positioning member 16. The base member 12 comprises a bottom wall 122, a sidewall 124, and an accommodation chamber 126 defined in the bottom wall 122. The accommodation chamber 126 is preferably made in the form of a sliding groove with a trapezoidal cross section. The sliding member 14 is configured to fit the profile of the accommodation chamber 126 of the base member 12. Further, the sliding member 14 is inserted into the accommodation chamber 126 of the base member 12 and axially movable relative to the base member 12. Further, the sliding member 14 defines a bevel sidewall portion 142 at one lateral side thereof. The positioning member 16 is fixedly mounted in the sidewall 124 of the base member 12, defining therein a through hole 162 in communication with the accommodation chamber 126 of the base member 12. In this embodiment, the positioning member 16 is welded to the base member 12.

The locking device set 20 is mounted at the positioning member 16 of the adjustable sliding bracket 10, comprising an anti-skid block 22, a coupling member 24, a connection member 26, a handle 28, a locking member 30, and an elastic member 32. The anti-skid block 22 is mounted between the sliding member 14 and the positioning member 16, and can be moved between the sliding member 14 and the positioning member 16 within a limited range. Further, the anti-skid block 22 defines a stop portion 222 and a through hole 224. The stop portion 222 is abutted against the bevel sidewall portion 142 of the sliding member 14. The connection member 26 is inserted through the through hole 224 of the anti-skid block 22 and tightly fastened to the coupling member 24. The coupling member 24 comprises opposing adapter portion 242 and linking portion 244, a first screw hole 246 defined in the end edge of the adapter portion 242, and a second screw hole 248 defined in the end edge of the linking portion 244. The adapter portion 242 of the coupling member 24 is threaded into the through hole 162 of the positioning member 16. The linking portion 244 of the coupling member 24 can be made in a toothed shape, star-like shape, or polygonal shape. The handle 28 comprises a barrel 282 located at one end thereof, an annular stop flange 284 disposed inside the barrel 282, a first receiving chamber 286 defined in the barrel 282 at one side of the annular stop flange 284, a second receiving chamber 288 defined in the barrel 282 at an opposite side of the annular stop flange 284, and a locating groove 290 located on one side of the annular stop flange 284 and facing toward the first receiving chamber 286 for receiving the linking portion 244 of the coupling member 24 in such a manner that the coupling member 24 is rotatable relative to the handle 28. The locking member 30 defines a head 302 at one end thereof. The elastic member 32 is mounted around the locking member 30, having its one end stopped against the head 302 of the locking member 30 and its other end stopped against the annular stop flange 284 and disposed in the second receiving chamber 288. In this embodiment, the through hole 162 of the positioning member 16 is an internally threaded screw hole and the adapter portion 242 is an externally threaded bolt, and thus the positioning member 16 is fastened to the coupling member 24 by screw joint, allowing rotation of the coupling member 24 in clockwise or counter-clock wise direction to move anti-skid block 22 forwards or backwards between a locking or unlocking position. Further, the connection member 26 and the locking member 30 are respectively made in the form of a screw bolt so that the connection member 26 and the locking member 30 can be respectively threaded into the first screw hole 246 and second screw hole 248 of the coupling member 24.

Figure 4:
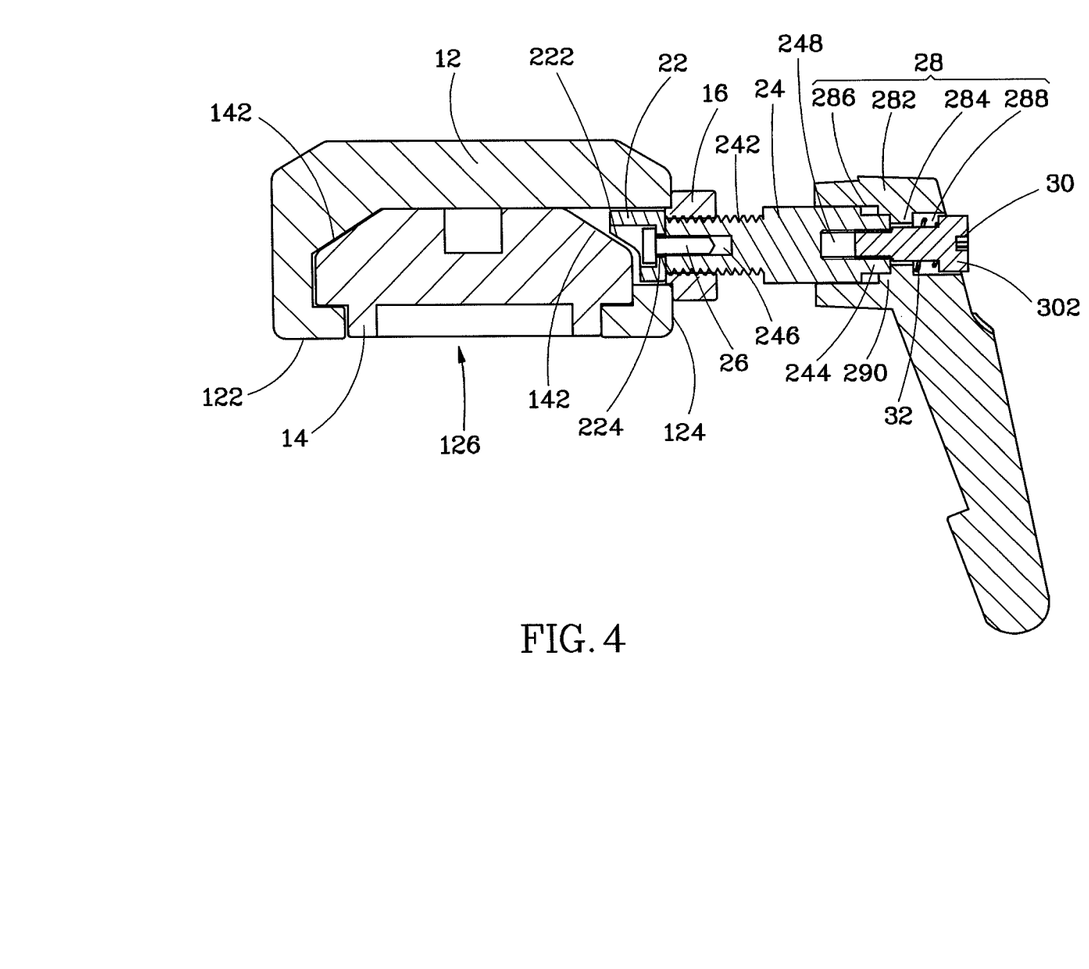
FIG. 4 is similar to FIG. 3, illustrating the anti-skid block released from the sliding member.

Referring to FIGS. 3 and 4 again, when the user wishes to adjust the length of the fitness equipment bracket adjustment structure, rotate the handle 28 in the reversed direction to drive the coupling member 24, moving the anti-skid block 22 to disengage the stop portion 222 from the bevel sidewall portion 142 of the sliding member 14. Due to that the anti-skid block 22 is stopped against the positioning member 16, excessively rotating the handle 28 in the counter-clockwise direction does not cause the handle 28 to fall down. When the user is going to lock the fitness equipment bracket adjustment structure after adjustment of the length, rotate the handle 28 in the clockwise direction to drive the coupling member 24 in moving the anti-skid block 22, forcing the stop portion 22 of the anti-skid block 22 to abut against the bevel sidewall portion 142 of the sliding member 14, thereby locking the adjustable sliding bracket 10 in the adjusted position.

Figure 5:
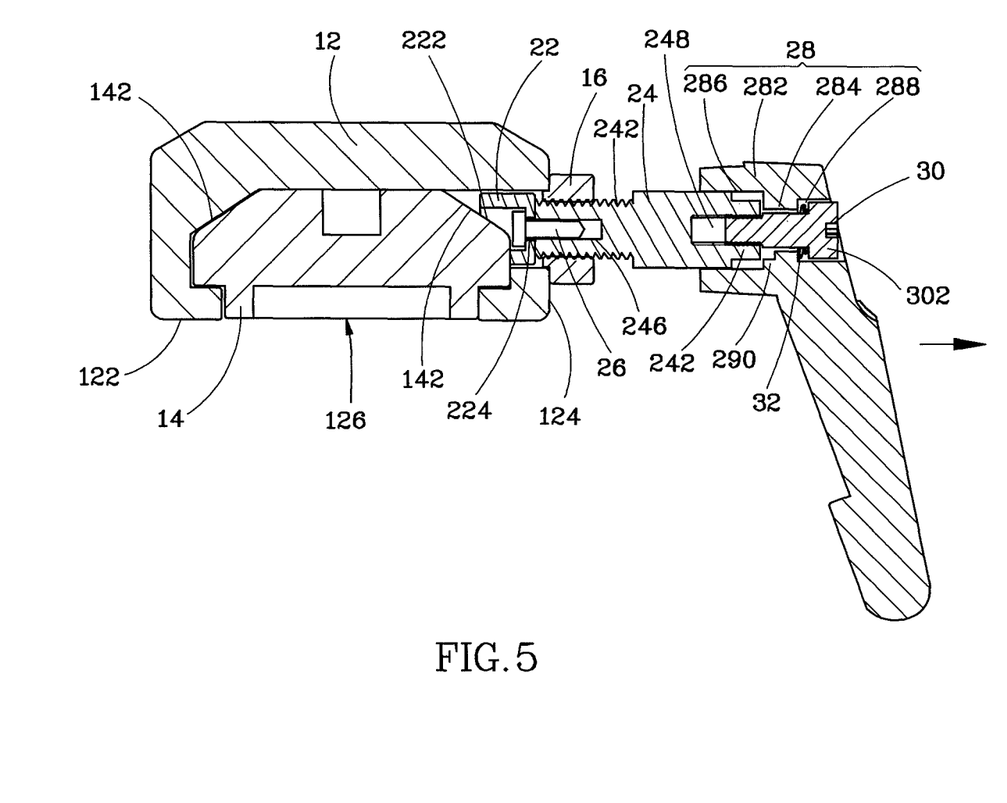
FIG. 5 is similar to FIG. 4, illustrating the relative relationship among the component parts upon pulling of the handle by an external pressure.
Figure 6:
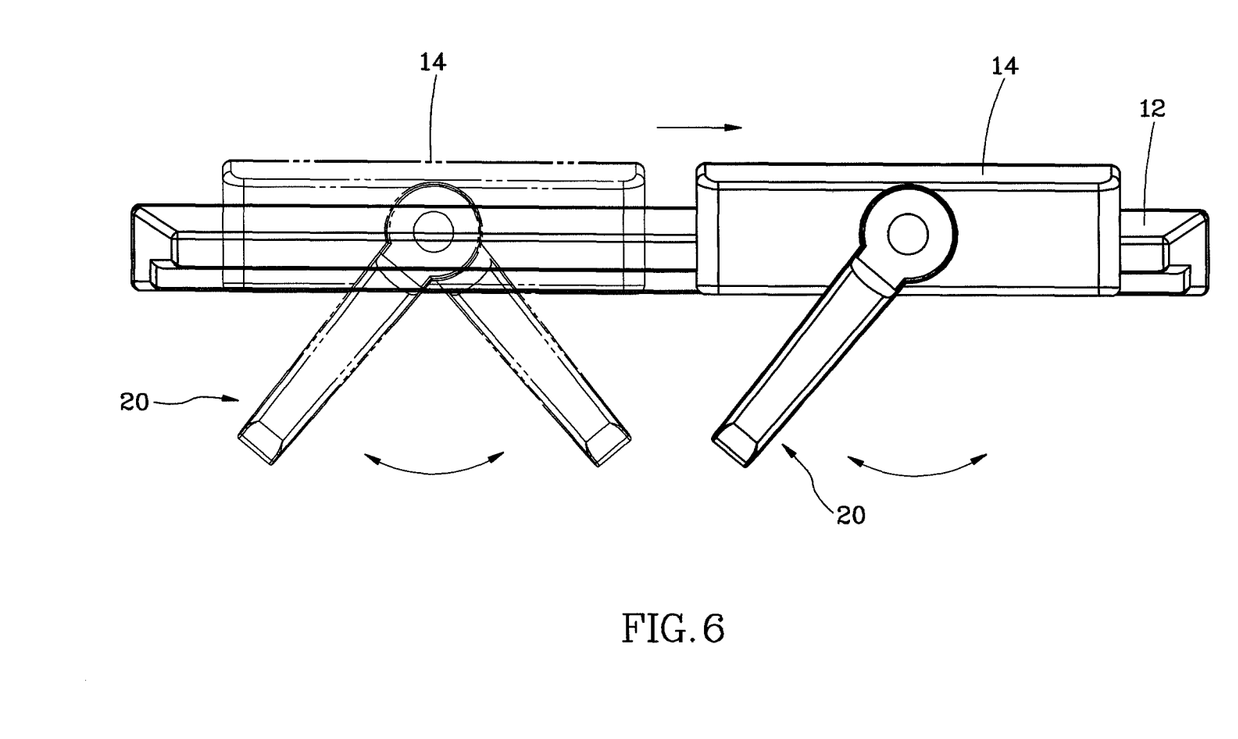
FIG. 6 is a schematic applied view of the present invention, illustrating an adjustment status of the fitness equipment bracket adjustment structure

Further, as shown in FIGS. 5 and 6, when the fitness equipment bracket adjustment structure is used in a narrow space or under any condition where the handle 28 cannot be rotated through one complete turn, adjustment of the length of the adjustable sliding bracket 10 can still be performed. In this case, the user should pull the handle 28 to disengage the locating groove 290 from the linking portion 242 of the coupling member 24. At this time, the handle 28 can be freely rotated on the axis that extends through the coupling member 24 and the locking member 30. Thereafter, bias the handle 28 forwardly or backwardly through an angle, and then release the handle 28, enabling the handle 28 to be pushed back by the elastic potential force of the elastic member 32 to its former position where the locating groove 290 of the handle 28 is engaged with the linking portion 244 of the coupling member 24, and then bias the handle 28 forwardly or backwardly to lock or unlock the adjustable sliding bracket 10. Thus, the invention allows the adjustable sliding bracket 10 to be locked or unlocked when the fitness equipment is used under an environment where the handle 28 can only be biased through a limited angle.

In conclusion, the invention provides a fitness equipment bracket adjustment structure, which has the advantages as follows:

1. Subject to the arrangement of the anti-skid block 22 between the sliding member 14 and the positioning member 16 for enabling the stop portion 222 of the anti-skid block 22 to be releasably abutted against the bevel sidewall portion 142 of the sliding member 14 and the arrangement of the connection medium of the coupling member 24 between the handle 28 and the anti-skid block 22, the handle 28 can be rotated clockwise (forwards) or counter-clockwise (backwards) to move the anti-skid block 22 into engagement with or away from the sliding member 14, and thus, the use of the present invention in a fitness machine allows adjustment of the length of the bracket conveniently and rapidly so that users of different heights can perform exercises comfortably and conveniently.
2. By means of abutting the anti-skid block 22 against the positioning member 16 and stopping the locking member 30 and the elastic member 32 against the handle 28, the handle 28 will not fall down accidentally when it is excessively rotated during adjustment.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A fitness equipment bracket adjustment structure, comprising:

an adjustable sliding bracket comprising a base member, a sliding member and a positioning member, said base member comprising a bottom wall, a sidewall and an accommodation chamber defined in said bottom wall, said sliding member being mounted in said accommodation chamber of said base member and axially movable relative to said base member, said positioning member being fixedly mounted at said sidewall of said base member and defining therein a through hole in communication with said accommodation chamber of said base member; and a locking device set mounted at said positioning member of said adjustable sliding bracket, said locking device set comprising an anti-skid block, a connection member, a coupling member and a handle, said anti-skid block being mounted between said sliding member and said positioning member, said anti-skid block comprising a stop portion and a through hole, said stop portion being detachably stopped against said sliding member of said adjustable sliding bracket, said connection member being inserted through the through hole said anti-skid block and fixedly connected to said coupling member, said coupling member comprising an adapter portion at one end thereof and inserted into the through hole of said positioning member, said handle being connected to an opposite end of said coupling member remote from said adapter portion and operable to move said anti-skid block between said sliding member and said positioning member;

wherein said handle of said locking device set comprises a barrel located at one end thereof, an annular stop flange disposed inside said barrel, a first receiving chamber defined in said barrel at one side of said annular stop flange for receiving said connection member and a second receiving chamber defined in said barrel at an opposite side of said annular stop flange; said locking device set further comprises a locking member and an elastic member, said locking member comprising a head, said elastic member being mounted around said locking member and having one end thereof stopped against the head of said locking member and an opposite end thereof received in said second receiving chamber and stopped against said annular stop flange.

2. The fitness equipment bracket adjustment structure as claimed in claim 1, wherein the through hole of said positioning member is an internally threaded screw hole; the adapter portion of said coupling member is an externally threaded bolt threaded into said internally threaded screw hole of said positioning member.

3. The fitness equipment bracket adjustment structure as claimed in claim 1, wherein said accommodation chamber of said base member is a trapezoidal accommodation chamber; said sliding member fits said trapezoidal accommodation chamber of said base member, comprising a bevel sidewall portion; said stop portion of said anti-skid block is detachably abutted against said bevel sidewall portion of said sliding member.

4. The fitness equipment bracket adjustment structure as claimed in claim 3, wherein said handle further comprises a locating groove located on one side of said annular stop flange and facing toward said first receiving chamber; said coupling member comprises a linking portion engaged into said locating groove of said handle.

5. The fitness equipment bracket adjustment structure as claimed in claim 4, wherein said connection member and said locking member are respectively made in the form of a screw bolt; said coupling member comprises a screw hole located in each of two opposite ends thereof for engagement with said connection member and said locking member respectively.

6. The fitness equipment bracket adjustment structure as claimed in claim 5, wherein said positioning member is welded to said sidewall of said base member.

* * * * *